2,806,855

PRODUCTION OF PYRROLIDONE CARBOXYLIC ACID

Forest A. Hoglan, Glenview, Ill., assignor to International Minerals & Chemical Corporation, a corporation of New York No Drawing. Application August 10, 1953, Serial No. 373,454

9 Claims. (Cl. 260—326.3)

The present invention relates to the preparation of pyrrolidone carboxylic acid. More particularly, it relates to the preparation of substantially pure pyrrolidone carboxylic acid from glutamic acid.

In the past, pyrrolidone carboxylic acid, which is the anhydride of glutamic acid, has been prepared by heating a glutamic acid solution or suspension under conditions which will produce a mixture of glutamic acid and pyrrolidone carboxylic acid. Pyrrolidone carboxylic acid has been separated from these mixtures which contains unconverted glutamic acid by extraction with butanol. Because of the limited solubility of pyrrolidone carboxylic acid in butanol, it is necessary to employ very large volumes of this solvent to completely extract the pyrrolidone carboxylic acid present in the mixture. Glutamic acid is slightly soluble in butanol, and in order to produce a pyrrolidone carboxylic acid product which is free from glutamic acid a prolonged series of extractions and recrystallizations are necessary. Generally, the extraction and recrystallization procedure must be repeated at least six times each in order to obtain pyrrolidone carboxylic acid which is substantially free of glutamic acid. The overall yield of pure pyrrolidone carboxylic acid is generally extremely low when this method is employed.

It is an object of the instant invention to provide an improved process for the production of substantially pure pyrrolidone carboxylic acid.

It is a further object of the instant invention to provide an improved method for the separation of pyrrolidone carboxylic acid from glutamic acid.

It is a further object of the instant invention to provide a method for the production of pyrrolidone carboxylic acid which is substantially free of glutamic acid and in comparatively high yield by a commercially feasible process.

These and other objects of the instant invention will become more apparent upon a fuller understanding of the instant invention as hereinafter set forth.

The instant invention involves the preparation of substantially pure pyrrolidone carboxylic acid by a single extraction and crystallization step. Pyrrolidone carboxylic acid is selectively separated from a mixture containing it in association with glutamic acid when a solvent comprising essentially between about 15% and about 4% water and between about 85% and about 96% of a saturated ketone having between three and five carbon atoms per molecule, for example, acetone is employed. Pyrrolidone carboxylic acid has a relatively high solubility and glutamic acid has an extremely low solubility in this solvent mixture. Solid glutamic acid is separated from the resulting solution, for example by filtration. A straight chain water soluble monohydric alcohol having a boiling point between about 100° C. and about 200° C., such as butanol, is admixed with the solution containing the pyrrolidone carboxylic acid, and the extraction solvent is removed, for example, by evaporation or its equivalent. Pyrrolidone carboxylic acid is crystallized from the resulting butanol solution.

In a specific embodiment of the instant invention, a suspension of glutamic acid in water is heated at a temperature between about 90° C. and about 100° C. until equilibrium is substantially reached. The resulting equilibrium mixture generally contains between about 90% and about 94% pyrrolidone carboxylic acid and between about 10% and about 6% glutamic acid. This mixture is concentrated to remove a major portion of the water then sufficient acetone is added to obtain a mixture of between about 85% and about 96% acetone and between about 15% and about 4% water. Pyrrolidone carboxylic acid remains dissolved while glutamic acid is precipitated and is separated from the solution, for example by filtration. Butanol is added to the resulting pyrrolidone carboxylic acid containing solution, and the resulting solution is concentrated, for example, by evaporation beyond the point of saturation with respect to pyrrolidone carboxylic acid. Acetone and water are removed from the pyrrolidone carboxylic acid solution by this concentration step. Pyrrolidone carboxylic acid is then crystallized from the solvent which is composed largely of butanol. The yield of pyrrolidone carboxylic acid is generally between about 65% and about 75% of the total pyrrolidone carboxylic acid present in the mixture.

In the practice of the instant invention pyrrolidone carboxylic acid is prepared from glutamic acid by any conventional method, for example, it is prepared by heating glutamic acid. Glutamic acid is suspended in water; generally between about 4 parts and about 10 parts water are employed per part of glutamic acid. This suspension is heated until it approaches equilibrium.

Upon heating an aqueous suspension of glutamic acid, an equilibrium concentration ratio of glutamic acid to pyrrolidone carboxylic acid is approached which depends upon the pH of the glutamic acid suspension. At a pH of about 7, at equilibrium the concentration ratio of pyrrolidone carboxylic acid to glutamic acid in the mixture is about 98% to about 2%, that is, about 98% of the glutamic acid has been converted to pyrrolidone carboxylic acid and about 2% of the glutamic acid remains unconverted. At higher and lower pH's the equilibrium concentration ratio of pyrrolidone carboxylic acid to glutamic acid is lower. For example, at a pH of about 3.2, about 92.5% of the glutamic acid is converted to pyrrolidone carboxylic acid. Although at a pH of about 7, glutamic acid is more completely converted to pyrrolidone carboxylic acid, the rate of conversion of glutamic acid to pyrrolidone carboxylic acid is relatively slow. At a pH of about 3.2, the conversion is much more rapid. Generally the glutamic acid suspension is heated at a pH between about 3.2 and about 7.0, preferably between about 3.2 and about 4.5. At pH's between about 3.2 and about 4.5, the rate of conversion of glutamic acid to pyrrolidone carboxylic acid is comparatively rapid and the equilibrium concentration of pyrrolidone carboxylic acid is above 92%.

The glutamic acid suspension is heated at a temperature between about 85° C. and about the reflux temperature of the mixture, preferably at between about 90° C. and about 95° C. Higher temperatures are avoided in order to prevent racemization of the pyrrolidone carboxylic acid.

Pyrrolidone carboxylic acid is separated from the mixture preferably with a solvent comprising essentially between about 90% and about 96% acetone and between about 10% and about 4% water. Prior to the addition of the acetone, excess water is removed by evaporation. Sufficient water is retained in the pyrrolidone carboxylic acid-glutamic acid mixture so that when actone is added the proper concentration ratio of acetone to water in the extracting solvent is obtained. Generally between about 4 parts and about 6 parts of acetone are added to each part of the mixture containing pyrrolidone carboxylic acid and glutamic acid, preferably about 4.5 parts of acetone are added per part of solution. Although acetone is the preferred reagent for the extraction, other saturated ketones having three to five carbon atoms per molecule such as methyl ethyl ketone and diethyl ketone may be employed. The resulting solution is allowed to stand between about 1 hour and about 24 hours at about atmospheric temperature, and the glutamic acid containing solid material is separated from the pyrrolidone carboxylic acid solution, for example, by filtration.

Butanol is added to the resulting pyrrolidone carboxylic acid containing solution. In the preferred practice of the invention the pure pyrrolidone carboxylic acid is crystallized from butanol. Between about 1 part and about 5 parts of butanol, preferably between about 1.5 parts and about 2.5 parts of butanol are added for each part of pyrrolidone carboxylic acid present in the solution. However, other straight chain water soluble monohydric alcohols such as pentanol is employed. The resulting solution is concentrated to or beyond the point of saturation with pyrrolidone carboxylic acid, for example, in vacuo. Acetone and water are removed from the pyrrolidone carboxylic acid solution by this concentration step. Pyrrolidone carboxylic acid is then crystallized from the butanol, for example, by cooling the solution and allowing the cooled solution to stand. The pyrrolidone carboxylic acid product which is separated is substantially free of glutamic acid. Solid glutamic acid which is precipitated by addition of acetone is suspended in water, heated to convert it to pyrrolidone carboxylic acid and subjected to the instant process for the recovery of pyrrolidone carboxylic acid as herein described.

As a specific example of the process, the following serves merely as an illustration, and it is not intended that the scope of the invention be limited thereto.

Example I

A suspension consisting of about 500 grams of glutamic acid and about 2 liters of water was heated at about 95° C. for about 168 hours. The resulting mixture contained about 85% pyrrolidone carboxylic acid and about 15% glutamic acid. Activated carbon was used to decolorize the solution, and the resulting decolorized solution, from which the carbon had been separated, was concentrated to about 545 grams. The concentrated mixture contained about 100 grams of water. About 3 liters of acetone was added to the mixture which was allowed to stand for about sixteen hours. Solid glutamic acid was separated from the resulting solution by filtration. About 700 milliliters of butanol was then added to the filtrate, and the resulting solution was concentrated in vacuo to the point of incipient crystallization of pyrrolidone carboxylic acid. After cooling and standing for a short time, pyrrolidone carboxylic acid crystallized and was separated from the solution. About 270 grams of pyrrolidone carboxylic acid which was free of glutamic acid, as determined by the conventional ninhydrin test, was obtained.

Having thus fully described and illustrated the character of the invention, what is desired to be secured and claimed by Letters Patent is:

1. A process for the production of substantially pure pyrrolidone carboxylic acid which comprises separating pyrrolidonecarboxylic acid from a mixture of glutamic acid and pyrrolidonecarboxylic acid by treating said mixture in an aqueous system with a saturated ketone having between 3 and 5 carbon atoms per molecule, in which aqueous system the ketone comprises between about 85% and about 96% of the total weight of the liquids, and water comprises between about 15% and about 4% of the total weight of the liquids, separating solid glutamic acid from the resulting pyrrolidone carboxylic acid-containing solution, adding a saturated straight chain monohydric alcohol having a boiling point between about 100° C. and about 200° C. to the pyrrolidone carboxylic acid solution, concentrating the resulting solution at least to the point of saturation with respect to pyrrolidone carboxylic acid, and crystallizing and separating pyrrolidone carboxylic acid from the resulting solution.

2. A process for the production of substantially pure pyrrolidone carboxylic acid which comprises separating pyrrolidonecarboxylic acid from a mixture of glutamic acid and pyrrolidonecarboxylic acid by treating said mixture in an aqueous system with a saturated ketone having between 3 and 5 carbon atoms per molecule, in which aqueous system the ketone comprises between about 85% and about 96% of the total weight of liquids, and water comprises between about 15% and about 4% of the total weight of the liquids, separating solid glutamic acid from the resulting pyrrolidone carboxylic acid-containing solution, adding butanol to said pyrrolidone carboxylic acid solution, concentrating the resulting solution at least at the point of saturation with respect to pyrrolidone carboxylic acid, and crystallizing and separating substantially pure pyrrolidone carboxylic acid from the resulting solution.

3. A process for the production of substantially pure pyrrolidone carboxylic acid which comprises extracting pyrrolidone carboxylic acid from a mixture containing pyrrolidone carboxylic acid and glutamic acid with a solvent comprising between about 85% and about 96% by weight of acetone and between about 15% and about 4% by weight of water, separating solid glutamic acid from the resulting pyrrolidone carboxylic acid-containing solution, adding a saturated straight chain monohydric alcohol having a boiling point between about 100° C. and about 200° C. to the pyrrolidone carboxylic acid solution, concentrating the resulting solution at least to the point of saturation with respect to pyrrolidone carboxylic acid, and crystallizing and separating substantially pure pyrrolidone carboxylic acid from the resulting solution.

4. A process for the production of substantially pure pyrrolidone carboxylic acid which comprises extracting pyrrolidone carboxylic acid from a mixture containing pyrrolidone carboxylic acid and glutamic acid with a solvent comprising between about 85% and about 96% by weight of acetone and between about 15% and about 4% by weight of water, separating solid glutamic acid from the resulting pyrrolidone carboxylic acid-containing solution, adding butanol to the pyrrolidone carboxylic acid solution, concentrating the resulting solution at least to the point of saturation with respect to pyrrolidone carboxylic acid, and crystallizing and separating substantially pure pyrrolidone carboxylic acid from the resulting solution.

5. A process for the production of substantially pure pyrrolidone carboxylic acid which comprises extracting pyrrolidone carboxylic acid from a mixture containing pyrrolidone carboxylic acid and glutamic acid with a solvent comprising between about 90% and about 96% by weight of acetone and between about 10% and about 4% by weight of water, separating solid glutamic acid from the resulting pyrrolidone carboxylic acid-containing solution, adding between about 1 part and about 5 parts of butanol per part of pyrrolidone carboxylic acid present in said solution, concentrating the resulting solution beyond the point of saturation with respect to pyrrolidone carboxylic acid, and crystallizing and separating substantially pure pyrrolidone carboxylic acid therefrom.

6. A process for the production of substantially pure pyrrolidone carboxylic acid which comprises extracting pyrrolidone carboxylic acid from a mixture containing between about 70% and about 98% by weight of pyrrolidone carboxylic acid and between about 30% and about 2% by weight of glutamic acid with a solvent comprising between about 85% and about 96% by weight of acetone and between about 15% and about 4% by weight of water, storing the resulting solution between about 1 hour and about 24 hours, separating solid glutamic acid from the resulting pyrrolidone carboxylic acid-containing solution, adding between about 1 part and about 5 parts of butanol per part of pyrrolidone carboxylic acid present in said solution, concentrating the resulting solution at least to the point of saturation with respect to pyrrolidone carboxylic acid, and crystallizing and separating substantially pure pyrrolidone carboxylic acid therefrom.

7. A process for the production of substantially pure pyrrolidone carboxylic acid which comprises heating an aqueous suspension of glutamic acid at a temperature between about 85° C. and about the reflux temperature until the mixture has approached substantial equilibrium, extracting the pyrrolidone carboxylic acid from the resulting equilibrium mixture with a solvent comprising between about 85% and about 96% by weight of acetone and between about 15% and about 4% by weight of water, separating solid glutamic acid from the resulting pyrrolidone carboxylic acid-containing solution, adding butanol to the resulting pyrrolidone carboxylic acid solution, concentrating the resulting solution beyond the point of saturation with respect to pyrrolidone carboxylic acid, and crystallizing and separating substantially pure pyrrolidone carboxylic acid therefrom.

8. A process for the production of substantially pure pyrrolidone carboxylic acid which comprises heating an aqueous suspension of glutamic acid at a temperature between about 85° C. and about the reflux temperature until the mixture has approached equilibrium, decolorizing the resulting mixture, extracting the pyrrolidone carboxylic acid from the decolorized equilibrium mixture with a solvent comprising between about 90% and about 96% by weight of acetone and between about 10% and about 4% by weight of water, storing the resulting solution between about 1 hour and about 24 hours, separating solid glutamic acid from the resulting pyrrolidone carboxylic acid-containing solution, adding between about 1 and about 5 parts of butanol per part of pyrrolidone carboxylic acid solution, concentrating the resulting solution at least to the point of saturation with respect to pyrrolidone carboxylic acid, and crystallizing and separating substantially pure pyrrolidone carboxylic acid therefrom.

9. A process for the production of substantially pure pyrrolidonecarboxylic acid which comprises dissolving a pyrrolidonecarboxylic acid-glutamic acid mixture in water, concentrating the solution, adding to said solution an amount of saturated ketone having between 3 and 5 carbon atoms per molecule sufficient to make the ketone between 85% and about 96% by weight of the liquids, crystallizing out glutamic acid, separating solid glutamic acid from the resulting pyrrolidonecarboxylic acid-containing solution, adding butanol to said pyrrolidonecarboxylic acid solution, concentrating the solution by removing acetone and water, and crystallizing and separating substantially pure pyrrolidonecarboxylic acid from the resulting butanol solution.

References Cited in the file of this patent

UNITED STATES PATENTS

| | | |
|---|---|---|
| 2,112,329 | Braun | Mar. 29, 1938 |
| 2,528,267 | Dearborn et al. | Oct. 31, 1950 |